(12) United States Patent
Hahner et al.

(10) Patent No.: US 6,176,260 B1
(45) Date of Patent: Jan. 23, 2001

(54) FUEL TANK WITH INCORPORATED DEFORMABLE RESERVOIR

(75) Inventors: Rainer Hahner; Rüdiger Walter, both of Bonn; Axel Wagner, Bonn-Beuel, all of (DE); Andreas G. R. Puempel, Essex; Lou Savoni, LaSalle, both of (CA); Jim Siekmann, Crystal City, MO (US)

(73) Assignee: Kautex Textron GmbH & Co. KG, Bonn (DE)

( * ) Notice: Under 35 U.S.C. 154(b), the term of this patent shall be extended for 0 days.

(21) Appl. No.: 09/360,676

(22) Filed: Jul. 26, 1999

(30) Foreign Application Priority Data

Jul. 27, 1998 (DE) .............................. 198 33 698

(51) Int. Cl.[7] .................................................. F02M 37/04
(52) U.S. Cl. ................... 137/590; 137/565.37; 137/574; 123/468
(58) Field of Search ..................... 137/590, 592, 137/565.24, 565.37, 574; 123/468, 469; 417/363

(56) References Cited

U.S. PATENT DOCUMENTS 4,709,723 * 12/1987 Sidaway et al. ............... 137/592 X
4,780,063 * 10/1988 Tuckey ............................ 137/590 X
5,482,444 * 1/1996 Coha et al. .......................... 417/363
5,596,971 * 1/1997 Kidokoro ........................... 123/516
5,979,417 * 11/1999 Hyodo et al. ...................... 123/516

FOREIGN PATENT DOCUMENTS 196 50 244   6/1998 (DE) .

* cited by examiner

Primary Examiner—Kevin Lee
(74) Attorney, Agent, or Firm—Seidel, Gonda, Lavorgna & Monaco, P.C.

(57) ABSTRACT

A fuel tank for a motor vehicle, comprising a tank body with a smaller reservoir which is arranged therein and which is inserted into the tank body through a closable opening in the wall thereof, and joined thereto. The reservoir is deformable at least in portions of the wall defining same. After the reservoir has been at least partially inserted into the tank body, it undergoes a change in shape resulting in an increase in its volume within the tank body and a change in its cross-section such that the largest cross-section of the reservoir is larger than the cross-section of the opening of the wall in the tank body, that is available for insertion of the reservoir. The reservoir is defined at its ends by rigid components and the deformable wall portion of the reservoir is in the region between those components.

31 Claims, 7 Drawing Sheets

FUEL TANK WITH INCORPORATED DEFORMABLE RESERVOIR

FIELD OF THE INVENTION

The invention concerns a fuel tank, for example for a motor vehicle, incorporating a deformable reservoir within it.

BACKGROUND OF THE INVENTION

A fuel tank for a motor vehicle may typically comprise a tank body with a reservoir arranged therewithin. The reservoir is normally part of a fuel delivery unit for supplying the engine of the motor vehicle with fuel such as gasoline or diesel. In that respect, the reservoir which is of a volume that is substantially smaller than that of the fuel tank overall is intended in particular to ensure the function that, even under adverse operating conditions, for example when the motor vehicle in which the fuel tank is installed is negotiating a curve or bend of considerable length or when the vehicle with the fuel tank is in a position that is not horizontal, there is always an adequate amount of fuel in the region of the intake for the fuel pump. That presupposes the presence of a certain minimum amount of fuel in the reservoir and thus a corresponding minimum volume for the reservoir itself.

In the case of tanks which are produced in one piece, for example those which are made from thermoplastic material, preferably by means of extrusion blow molding, in many cases the necessity arises for the reservoir to be introduced into the tank, after manufacture thereof, through an opening which is subsequently formed in the wall of the tank body. As for example for reasons of stability and sealing integrity of the opening which is to be closed after the reservoir has been fitted into the tank, it is desirable for the opening to be kept as small as possible, previous tanks of this kind suffer from the disadvantage that the reservoir which is to be fitted into the tank interior through the opening is of a correspondingly small volume which for example can be of the order of magnitude of between 0.5 and 1 liter. In many cases, having regard to the duration of the above-mentioned adverse operating conditions which can occur in a practical context and during which only a small amount of or no fuel flows into the reservoir out of the tank body volume surrounding the reservoir, the above-indicated reservoir volume is too small. It is possible to counter that disadvantage by the reservoir being of a deformable nature, at least over portions of the wall defining same, in such a way that, after it has been inserted into the fuel tank body, it experiences a change in shape which results in an increase in its volume and a change in its cross-section within the tank body. A procedure of that kind can be applied in a practical situation however only when the reservoir with the associated components is designed in a manner which permits easy handling thereof both when fitting the reservoir in the tank and also in terms of the measures which result in the desired increase in the volume of the reservoir.

SUMMARY OF THE INVENTION

An object of the present invention is to provide a fuel tank which is of such a design as to make it possible to use larger reservoirs therein without for that purpose increasing the opening in the wall of the tank for insertion of the reservoir.

A further object of the present invention is to provide a fuel tank for example for a motor vehicle, incorporating a reservoir which including the components associated therewith is to be such that it can be without difficulty handled such as inserted into the tank and moved into the desired definitive position and shape thereof within the tank body without the required function of the reservoir being adversely affected by the handling measures required for the fitting and installation procedure.

Still another object of the present invention is to provide a motor vehicle fuel tank incorporating a fuel reservoir therewithin such as to withstand virtually all loadings which may arise in a context of practice operation.

In accordance with the principles of the present invention the foregoing and other objects are attained by a fuel tank for a motor vehicle, comprising a fuel tank body having a wall defining the fuel tank body, the wall having a closable opening therethrough. A reservoir of smaller size than the fuel tank body is disposed therein, being inserted into the tank body through the closable opening in the wall thereof. The reservoir is suitably connected to the tank body. The reservoir is deformable at least over portions of a boundary wall thereof in such a way that after it has been at least partially introduced into the tank body it experiences a change in shape resulting in an increase in its volume within the tank body and a change in its cross-section such that the largest cross-section of the reservoir in its operative position is larger than the cross-section of the opening in the wall of the tank body, that is available for insertion of the reservoir into the tank body. The reservoir is delimited at its first and second ends by firm components and the deformable wall portions of the reservoir are in the region between the said components at the respective ends of the reservoir.

It will be noted at this point that the term 'firm components' used in the preceding paragraph and further employed hereinafter is to be interpreted as meaning that those components are of the stiffness and strength which for example at least approximately corresponds to the wall of the tank body. The firm components as defined hereinbefore may also comprise plastic material and can be produced for example by an injection molding procedure. They are at any event markedly less elastically deformable than the wall surfaces of the reservoir, the elastic deformation of which causes the increase in volume thereof, and they are substantially rigid in comparison with those wall surfaces.

The configuration according to the invention makes it possible for the reservoir to be designed in the form of a prefabricated unit which can be introduced into and secured in position on the tank in a simple operating procedure. The presence of the firm components at the two ends means that there is no need to take particular precautions for connecting the reservoir to the wall of the tank body.

The reservoir can also readily be of such a configuration that it delimits a closed space or chamber therewithin, the walls of which are only provided with the usual apertures therethrough for the fuel and the electric lines for pumps, filling level sensors and other similar items of equipment.

Preferably, the reservoir is disposed between the bottom of the tank body and the top wall of the tank body disposed at a spacing from the bottom of the tank body, in such a way that the firm component at the one end of the reservoir is connected to the bottom of the tank body and the firm component at the other end of the reservoir is connected to the top wall of the tank body. The firm components may be fixed to the bottom and top wall of the tank body respectively by being suitably supported thereon, by being mounted thereto or by resting thereagainst. It is then possible for the lateral walls of the reservoir to be adapted to be deformable over a substantial part of the longitudinal extent of the reservoir.

Preferably, the deformation of the reservoir which causes an increase in its volume at least in a transverse direction is achieved by a reduction in the axial extent of the reservoir. In that respect, the arrangement can be such that, before it is introduced into the tank, the reservoir is of a length which is greater than the spacing between the two mutually oppositely disposed wall regions of the tank, that is to say the bottom and the top wall of the tank body, between which in its operative position the reservoir is arranged and possibly also braced. After the reservoir has been subjected to a reduction in its length resulting in the desired increase in volume at least in the transverse direction thereof, in the course of being introduced into the tank, by virtue of being subjected to axially directed forces, then the reservoir can be held by suitable means in its operative position in which it extends between the two mutually opposite wall regions of the tank body, for example the bottom of the tank body and the top wall portion thereof to which its one upper end is appropriately fixed.

In accordance with a further preferred feature of the invention, it will generally be desirable for the deformable region of the wall of the reservoir to be made from an elastic material, for example rubber or a suitable plastic material. It is only necessary in that respect that the material used can be sufficiently mechanically loaded and stressed and that it is resistant to the fuel which is to be contained in the tank. Thus, the deformable wall region can for example comprise a tubular or balloon-shaped portion which at each end is connected to one of the above-mentioned components of for example plastic material which is set to a hard condition, whereby the reservoir is suitably held in place by those components. The components may preferably extend perpendicularly to the longitudinal axis of the reservoir. The component which is operatively associated with the bottom of the tank body can also serve at the same time as a holder for the motor-driven pump.

The component at the other end, being the upper end, of the deformable, for example tubular, wall portion of the reservoir, which component also serves as a closure means for the reservoir, can at the same time also serve as a closure cover for the opening provided in the wall of the tank for insertion of the reservoir assembly. A deformable support element or support structure for the tubular wall or balloon wall of the deformable part of the reservoir can also be disposed between the two closure portions or upper and lower components at the respective ends of the reservoir, and can join same together. During the operation of inserting the reservoir into the tank, at least partial regions of the side walls of the reservoir and/or the support element or support structure can be deformed under stress. That will be the case for example when the reservoir assumes its definitive configuration in the non-loaded condition. In that case, for the purposes of inserting it into the tank body, the reservoir would have to be compressed in such a way that its largest cross-section is no greater than that of the opening in the wall of the tank body. On the other hand however there is also the possibility of the reservoir being so designed that it can be introduced into the tank while the reservoir is in the non-loaded condition in which in particular its side wall and/or the support element or support structure is or are not in a stressed condition, and then the reservoir can be put into the configuration required for operation thereof, for example by implementing an axial reduction in the length of the reservoir. When the reservoir experiences elastic deformation, an operative condition thereof can occur in which a force is applied to the two closure end portions or components. As however the force required to deform the reservoir for the purposes of increasing its volume at least in the transverse direction thereof is very slight, the resulting permanent force which acts on the closure portions or firm components and thus the walls of the tank body is also very slight and can therefore be disregarded.

In accordance with a preferred embodiment of the invention which has been found to be particularly advantageous, the deformable wall region of the reservoir may be provided with fold means which are adapted to at least partially open in the course of the change in shape of the deformable wall portion of the reservoir, that is to say the increase in the volume thereof. In that respect, it may be desirable for the reservoir to comprise first and second substantially frusto-conical portions which are connected together or which merge together at their regions of largest diameter, wherein the fold means of the one portion are displaced in the peripheral direction relative to the fold means of the other portion, by half the width of a fold means.

Irrespective of the configuration that the reservoir involves in the non-loaded condition, an axial stress which acts in the direction of an increase in the length of the reservoir and which is applied by the support element or support structure and/or the side walls of the reservoir can be used for the purposes of bracing the reservoir between the bottom and the oppositely disposed top wall of the tank body. For that purpose, there must be at least a residual stress which urges the two firm components at the respective ends of the reservoir, in the direction of increasing the spacing therebetween.

At any event, when the invention is carried into effect the initial volume of the reservoir can experience an increase by a factor of between about 1.5 and 2 by virtue of the increase in diameter of the deformable wall region of the reservoir. Another particular advantage of the invention is that applying same does not cause a significant increase in cost.

Further objects, features and advantages of the invention will be apparent from the description hereinafter of preferred embodiments of the invention.

DESCRIPTION OF THE PREFERRED EMBODIMENTS

Referring generally to FIGS. 1 through 5, reference numeral 10 therein denotes a fuel tank for example for a motor vehicle, which can be used for containing for example gasoline or diesel and which can be produced in any suitable fashion, for example in one piece using an extrusion blow molding procedure from plastic material. The fuel tank 10 has a tank body with a top wall 12 provided with an opening 14 therethrough, which can be produced for example by cutting out a suitable part of the top wall 12. A prepared fuel delivery unit indicated generally at 18 is fitted into the tank body of the tank 10 through the opening 14. It will be noted that the opening 14 is generally although not necessarily of a circular cross-section.

Figures 1, 4:
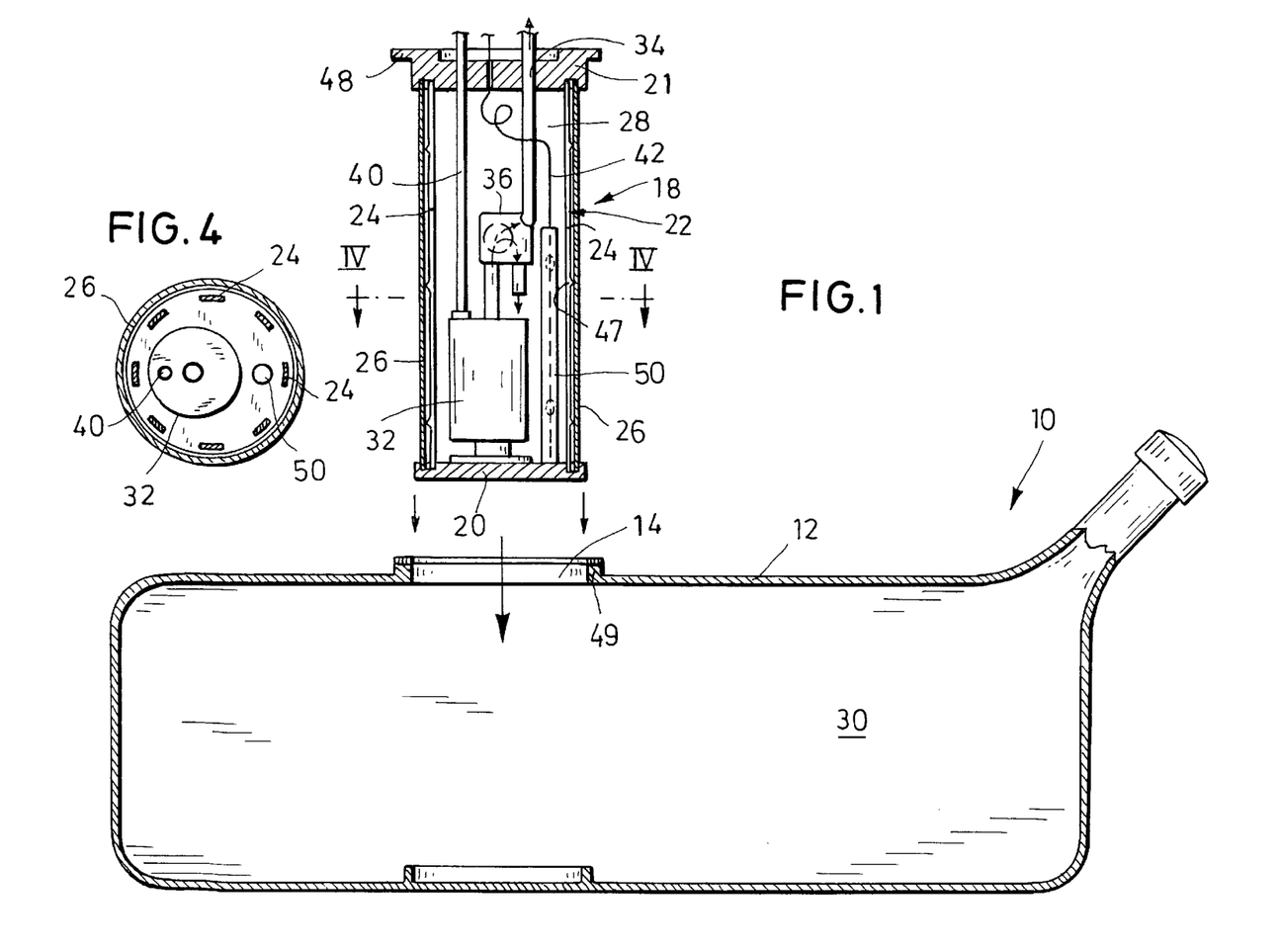
FIG. 1 is a view in longitudinal section through a fuel tank with a fuel delivery unit with reservoir, arranged outside the fuel tank, showing the delivery unit with reservoir in its initial configuration.
FIG. 4 is a view in section taken along line IV—IV in FIG. 1.
Figure 2:
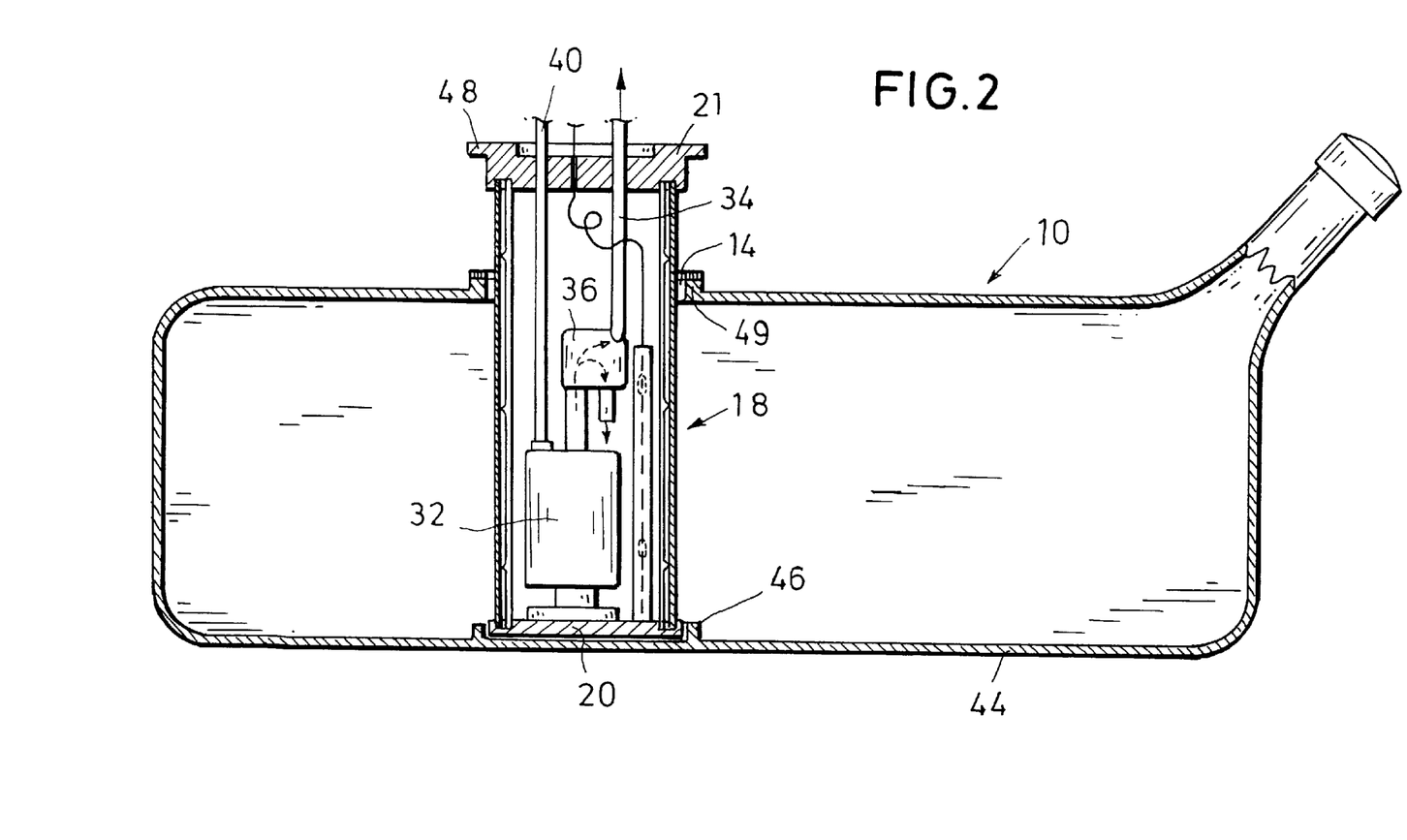
FIG. 2 shows the fuel tank of FIG. 1 with the delivery unit inserted therein, still in its initial configuration.
Figure 3:
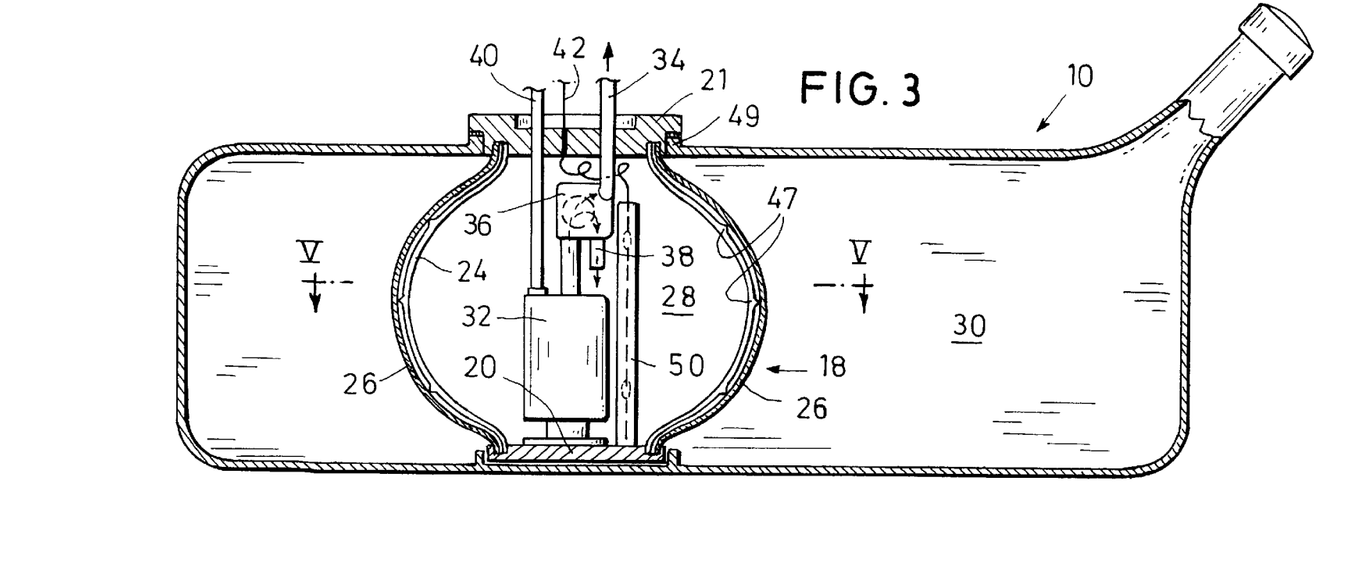
FIG. 3 shows the fuel tank of FIGS. 1 and 2 with the delivery unit in its installed position therein and in a deformed condition.
Figure 5:
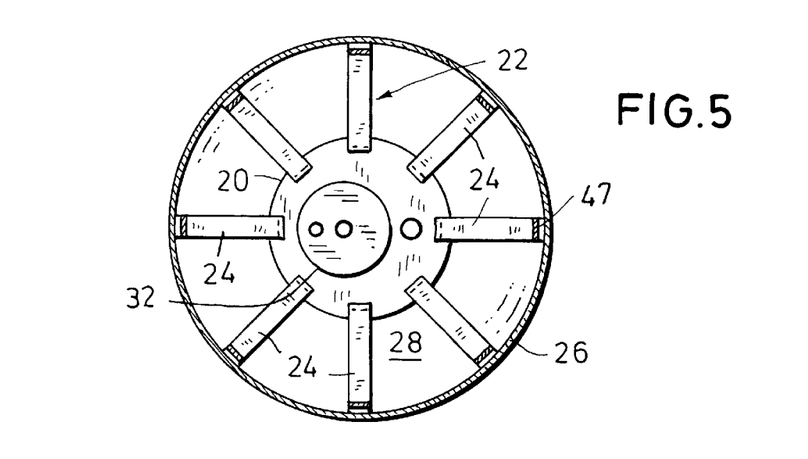
FIG. 5 is a view in section taken along line V—V in FIG. 3.

The fuel delivery unit 18 has a reservoir 28 for fuel and the function of which is essentially to ensure fault-free supply of fuel to the engine of the motor vehicle in which the tank 10 is installed.

The delivery unit 18 is provided at each of its upper and lower ends with a respective strong or firm component, more specifically an at least substantially non-deformable bottom portion 20 and an at least substantially non-deformable top portion 21 which accordingly delimit the reservoir 28 at respective ends thereof. The two components 20 and 21 are connected and held together by a support structure 22 comprising a plurality of, for example eight rods or bars 24 of strong, elastically deformable material such as for example spring steel or suitable plastic material. The bars 24 are arranged in mutually displaced relationship to each other preferably at equal spacings over the periphery of the delivery unit 18. On the outside thereof the support structure comprising the bars 24 is surrounded by an at least substantially tubular portion 26 of preferably elastically deformable material, for example rubber or plastic material. The tubular portion 26 delimits the substantial part of the actual reservoir 28, from which fuel is taken and fed to the engine of the motor vehicle in which the tank 10 is installed. The tubular portion 26 is connected both to the bottom portion 20 and also to the top portion 21 in sealing relationship therewith so that the reservoir 28 which is preferably of an at least approximately round cross-section is appropriately closed off with respect to the ambient atmosphere, apart from the feed and delivery lines leading into and extending from it.

The bottom portion 20 of the delivery unit 18 is of a generally plate-shaped or disk-shaped configuration and disposed thereon, within the space enclosed by the tubular portion 26 forming the peripheral wall of the reservoir 28, is a fuel pump which is indicated at 32 and which is driven by a suitable electric motor. Reference numeral 34 denotes a fuel feed line leading from the fuel pump 32 to the engine of the motor vehicle in which the tank 10 is disposed. Included in the line 34 within the reservoir 28 is a pressure regulator 36 from which a return line which is indicated at 38 in FIG. 3 extends back into the interior of the reservoir 28. The operating procedure involved with this assembly is usually such that the fuel pump 32 continually delivers per unit of time an amount of fuel which is greater than the amount required for the maximum operating state of the engine. The pressure regulator 36 provides for branching off the surplus fuel which is thus returned to the interior of the reservoir 28 through the return line 38, as indicated by the arrows shown for example in FIG. 1 within the diagrammatically illustrated pressure regulator 36.

The fuel line 34 for supplying the motor vehicle engine with the amount of fuel required for the respective operating state thereof is passed in fluid-tight relationship through the circular top portion 21 of the delivery unit 18. The top portion 21 is further provided with passages therethrough, through which electric lines 40, 42 are passed in fluid-tight relationship in order to supply the fuel pump 32 with electrical power and to connect a fuel filling level gauge or measuring device 50 for measuring the level of fuel in the reservoir 28, to a display system or the like.

The delivery unit 18 with reservoir 28 is mounted in the tank body of the tank 10 by a procedure whereby the delivery unit 18, starting for example from the condition shown in FIG. 1, is firstly introduced as a unit through the opening 14 in the top wall 12 of the tank body of the tank 10 into the position shown in FIG. 2 in which the bottom portion 20 of the delivery unit 18 rests on the bottom wall 44 of the tank 10. For that purpose, the bottom wall 44 of the tank 10 is provided with a holder 46, for example in the form of an annular rib, which is suitably matched to the external contour of the bottom portion 20 of the delivery unit 18 and which thus provides for a positively locking connection between the bottom portion 20 and the tank wall 44. It will be clearly seen from FIG. 2 in that respect that the bottom portion 20 fits snugly within the holder 46. The holder 46 can be formed integrally on the inside surface of the bottom wall 44 of the tank body 10, but for example it could also be subsequently fitted to the tank body, for example through the opening 14.

With the delivery unit 18 now in the arrangement and configuration shown in FIG. 2, an axial force is caused to act on the top portion 21 thereof, in a direction towards the bottom portion 20. The application of that force causes deformation of the bars 24 of the support structure within the peripheral surface of the delivery unit 18, in such a way that the bars 24 each experience an outwardly directed flexing movement which results in corresponding radial enlargement of the tubular or balloon-shaped portion 26 surrounding the support bars 24. Outwardly directed folds as indicated at 47 in for example FIGS. 1 and 3 are formed on the bars 24 of the support structure 22, the folds 47 ensuring that the bars 24 do at any event flex outwardly under the action of the axial force applied to the delivery unit 18. It will be appreciated that the portion 26 may also comprise non-elastic, easily deformable material which is of such a dimension from the outset that it is also enlarged under the effect of the expanding support structure 22.

The axial displacement of the top portion 21 towards the bottom portion 20 under the effect of the axial force applied to the delivery unit 18 is limited by a flange indicated at 48 in FIG. 1 on the outside of the top portion 21 coming to bear against the upwardly facing outside surface of the top wall 12 of the tank or a connecting portion or rim 49 provided on the top wall 12 around the opening 14. In the final or definitive position of the assembly as shown in FIG. 3 the top portion 21 serves at the same time as a cover for closing the opening 14 in the top wall 12 of the tank body. The top portion 21 can be fixed to the tank body or the top wall 12 thereof in any suitable usual manner, for example by a cap or union nut, a bayonet fixing or the like.

As described hereinbefore, the reservoir 28 can also be of such a design configuration that, in the non-loaded condition, it is of the configuration or at least approximately the configuration which it will also adopt during operation of the assembly so that it is deformed under stress for insertion thereof into the tank body through the opening 14, in order for the reservoir 28 thereby to be adjusted to the cross-section required for it to be introduced into the tank body. When the reservoir 28 then expands within the tank body, for example under the force of the support structure 22 bearing against the portion 26 of the reservoir 28, a residual stress may then still remain in the wall portion 26 of the reservoir and/or in the support structure 22, with the reservoir being braced by means of that residual stress between the two mutually oppositely disposed wall regions 12 and 44 of the tank body.

It will be further appreciated that it is also possible for the side all portion of the reservoir 28 to be such that, possibly without being elastic, it is deformable, and expansion thereof occurs only due to fuel flowing into the reservoir 28 if the reservoir 28 does not have a support structure such as 22 which experiences corresponding deformation.

Attention will now be directed to FIG. 3 showing the fuel tank 10 in the finished condition, with the delivery unit 18 subsequently installed therein. The delivery unit 18 includes the reservoir 28, the volume of which is substantially larger than that of the delivery unit 18 or reservoir 28 in the non-deformed condition as shown in FIGS. 1 and 2.

After installation of the delivery unit 18 in the tank 10, the components of the delivery unit 18 retain their positions shown in FIG. 3, which provide for the desired increase in the size of the reservoir 28, generally throughout the entire service life of the tank. As the reservoir 28, after being installed in the tank, does not involve any further change in its configuration and thus its volume, it is readily possible for the amount of fuel present in the reservoir 28, at least in regard to specific fuel filling levels, to be precisely ascertained by means of the filling level measuring device or gauge 50 which is disposed within the reservoir The electric motor-driven fuel pump 32 which is also disposed within the reservoir 28 can be of a two-stage design, in which case the first stage of the pump conveys fuel into the reservoir 28 from the space or chamber 30 in the tank 10, which surrounds the delivery unit 18 and the reservoir 28. For that purpose, the bottom portion 20 of the delivery unit 18 can be provided with a closable passage through which fuel is sucked into the reservoir 28 from the space 30. The second stage of the pump 32 then draws in fuel from the interior of the reservoir 28 and delivers it to the engine. As already mentioned above, the pressure regulator 36 provides for returning to the interior of the reservoir any amount of fuel which is surplus to the engine requirements.

Figure 6:
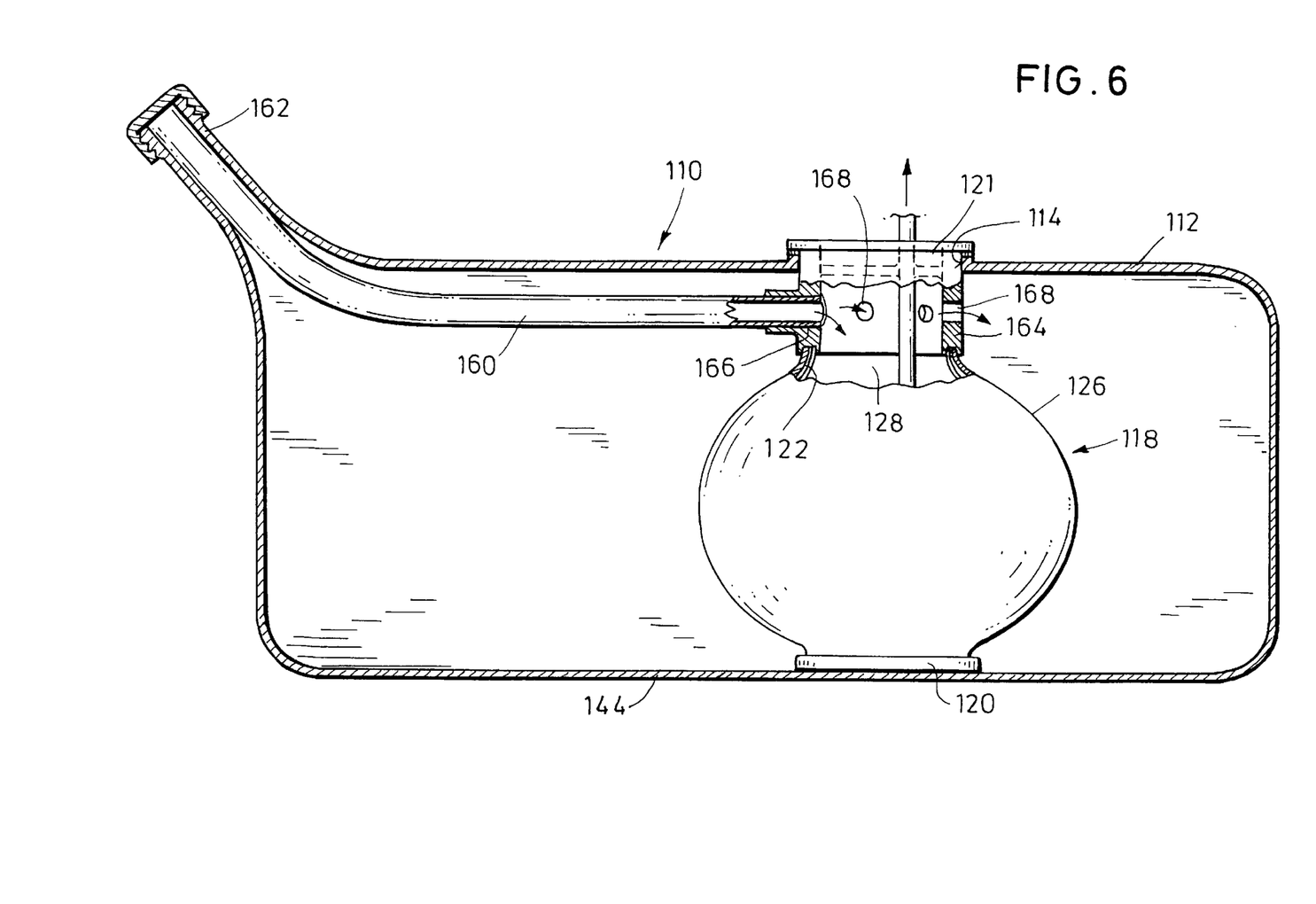
FIG. 6 is a view corresponding to FIGS. 1 through 3 of a second embodiment of the present invention.

Reference will now be directed to FIG. 6 showing a further embodiment of a fuel tank in accordance with the invention, which is once again the same in terms of general structure as the embodiment shown in FIGS. 1 through 5 so that there is no need at this point for a further detailed description of the arrangement shown in FIG. 6. For the same reason identical components are denoted by the same references but increased by 100.

As can be seen from FIG. 6, the difference in substance between the embodiment of FIGS. 1 through 5 and the embodiment of FIG. 6 is that the tank 110 is provided with a filling pipe 160 which extends from the filling connection or neck 162 of the tank 110 to the delivery unit 118. The top portion 121 thereof, constituting a component of strong firm material, is provided with a tubular extension portion 164 which is disposed in substantially coaxial relationship with the longitudinal axis of the elongate delivery unit 118 and which is connected at its lower end to the expandable tubular portion 126 and the support structure 122. The tubular extension portion 164 of the head portion 121 is provided with a hole 166 for accommodating the outlet or discharge end of the filling pipe 160 so that, when the tank 110 is filled through the filling connection 162, the fuel which is passed to the delivery unit 118 through the filling pipe 160 firstly flows into the reservoir 128 of the delivery unit 118. Thus, at any event, even if only small amounts of fuel are introduced into the tank 110, the illustrated arrangement ensures that fuel is to be found within the reservoir 128 and thus necessarily in the region of the intake opening of the fuel pump which is operable to draw fuel from the reservoir 128 to feed it to the engine of the motor vehicle in which the tank 110 is installed.

The tubular extension portion 164 is also provided with at least one and preferably a plurality of additional holes 168 through which, during a tank-filling operation, when the reservoir 128 is full, surplus fuel which reaches the level of the one or more holes 168 can flow out of the reservoir 128 into the surrounding region 130 of the fuel tank 110.

The arrangement shown in FIG. 6 is particularly advantageous for the operation of initially filling the tank of a motor vehicle, which is generally implemented using a special fuel, in which respect for cost reasons only a small amount of fuel which may be for example only between 1 and 2 liters is put into the tank. The illustrated arrangement ensures in any case that, even when such small amounts of fuel are involved, fuel is always present in the intake region of the pump for supplying fuel to the engine. Furthermore, even in other situations, for example when the tank has been completely run dry in normal operation of the vehicle, the illustrated arrangement ensures that a small amount of fuel is sufficient to cause fuel to be appropriately supplied to the engine for re-starting it.

The embodiment shown in FIG. 6 also makes it possible to use a delivery unit whose wall as indicated at 26 in FIGS. 1 through 5 or 126 in FIG. 6 is expanded under the effect of the fuel within the reservoir 28 or 128 respectively. In such a situation it would be possible to manage without an additional support structure as indicated at 22 or 122 respectively in FIGS. 1 through 5 or FIG. 6.

It is also possible to envisage a design configuration which involves using a self-supporting flexible portion of tubular or balloon configuration, for the peripheral wall portion of the reservoir or the delivery unit, which wall portion has reinforced or thickened regions operable to perform the functions of the support bars 24 of the supporting structure 22. As a consequence of this configuration, only one integral wall portion, possibly with an integrated support structure, would extend between the two end portions 21 and 20, or 121 and 120 respectively, of the delivery unit 18 or 118 respectively.

Figure 7:
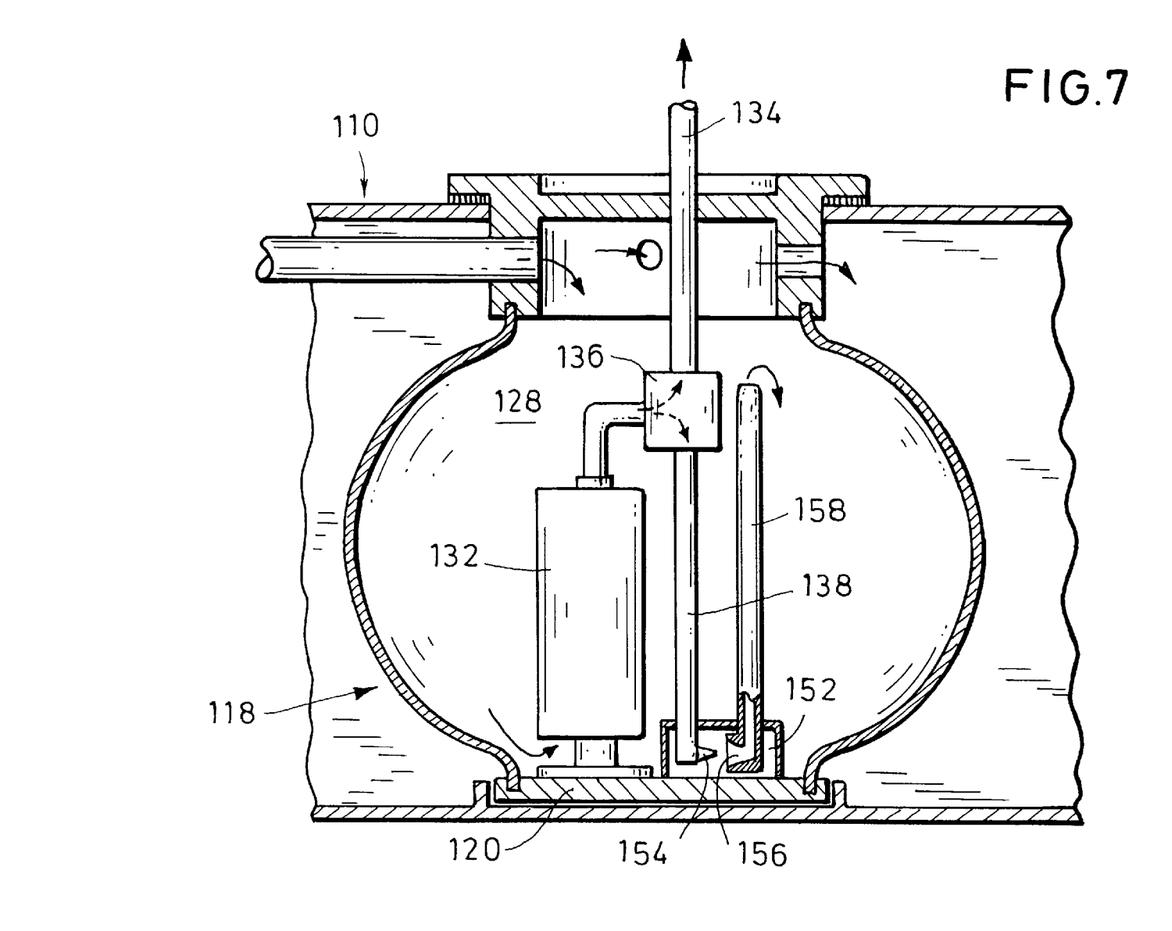
FIG. 7 is a view corresponding to FIG. 6 showing detail concerning fuel delivery.

Reference will now be directed to FIG. 7 showing a further embodiment which substantially corresponds to that shown in FIG. 6 so that once again the same components are also denoted by the same reference numerals, but increased from FIGS. 1 through 5 by a factor of 100, so that the reference numerals in FIG. 7 correspond to those used in FIG. 6.

Referring therefore now to FIG. 7 the delivery unit 118 has a bottom portion 120 provided with a chamber or recess indicated at 152, which communicates with the volume of the tank 110, which is outside the reservoir 128. That communication may be formed for example by a passage which extends through the bottom portion 120 and thus suitably opens into the chamber or recess 152. The return conduit 138 is passed back into the chamber 152, being sealed off with respect to the bottom portion 120. The return conduit 138 terminates in a propulsion nozzle 154 which is angled within the chamber 152 with respect to the substantially vertically extending return line 138 and which is arranged in opposite relationship to a catch or receiving nozzle 156 to form a suction jet pump. Connected to the nozzle 156 is a riser pipe 158 which is passed in fluid-tight relationship through the bottom portion 120 and which at its upper end terminates in the upper region of the reservoir 128. Thus, in the usual fashion, the flow energy of the fuel flowing back through the return line 138 is utilised to convey fuel out of the volume of the tank 110 outside the reservoir 128, into the latter. In this embodiment the reservoir 128 can also be sealingly closed off in the region of the bottom portion 120 with respect to the surrounding space in the tank 110 so that measurement of the level of fuel within the reservoir 128 is readily possible.

Reference will now be made to FIGS. 8 through 11 showing yet another embodiment of the present invention which once again is the same in terms of its general structure as the embodiments shown in FIGS. 1 through 7 respectively so that there is no need for a further detailed description of the arrangement of FIGS. 8 through 11 at this point. Once again the same components are denoted in FIGS. 8 through 11 by the same references as those used in FIGS. 6 and 7, but further increased in each case by 100.

In the embodiment of FIGS. 8 through 11, the reservoir 218 thereof is delimited at its periphery by a hollow body having a wall provided with a given fold or pleat geometry. The individual folds or pleats are of such a configuration and arrangement that the reservoir experiences an enlargement and expansion effect when the folds or pleats open up.

Figure 8:
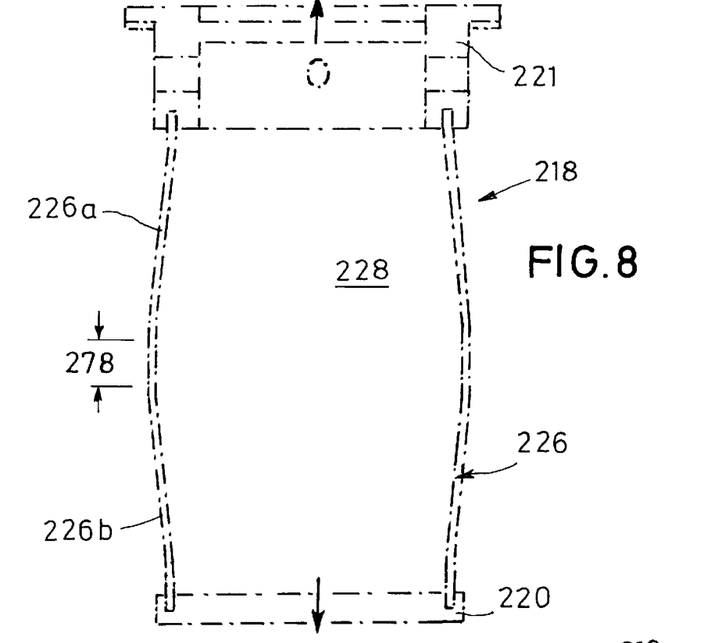
FIG. 8 is a diagrammatic view in longitudinal section through another embodiment of a reservoir in the condition thereof upon insertion into a tank.
Figure 11:
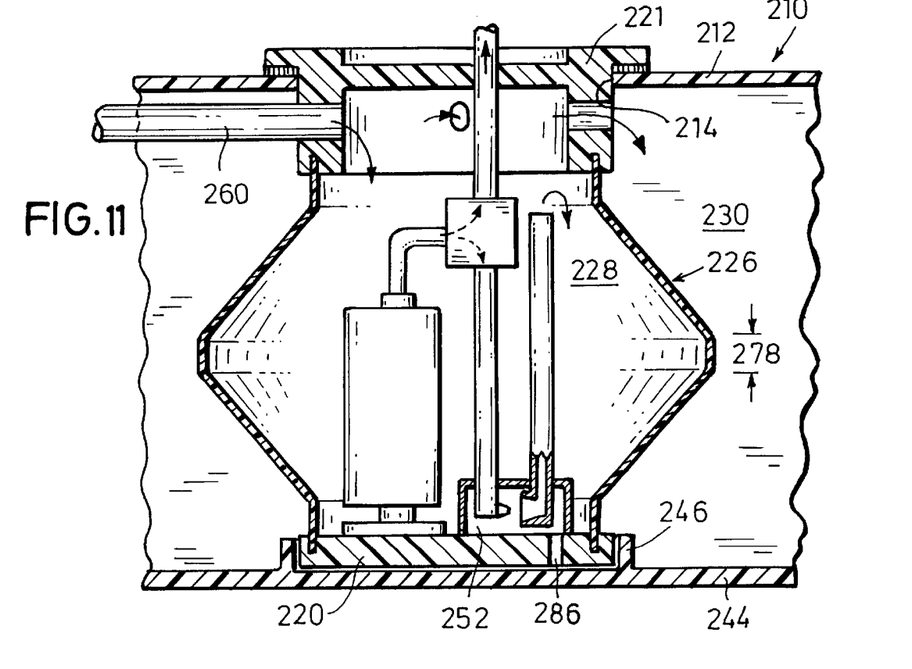
FIG. 11 is a view corresponding to FIG. 7 of the reservoir in its functional configuration of installation within the fuel tank.

Looking now more specifically at FIG. 8 the delivery unit 218 with reservoir 228 is shown in an extended or elongated condition in which the top portion 221 and the bottom portion 220 are at a greater spacing from each other than when the reservoir 228 is in its functional configuration which is shown for example in FIG. 11. After the delivery unit 218 has been fitted into the fuel tank 210, that is to say starting from a position corresponding to the position shown in FIG. 2, the hollow body and therewith the reservoir 228 experience a change in shape whereby the wall portion 226 of the hollow body which is of a concertina-like configuration experiences an increase in its diameter, with the folds or pleats indicated at 274a and 274b in FIG. 9 being expanded at the same time. At the end of the change in shape of the hollow body, the reservoir 218 is in its above-mentioned definitive or functional configuration which it retains during operation of the motor vehicle in which the fuel tank including the reservoir 218 is installed.

Figure 9:
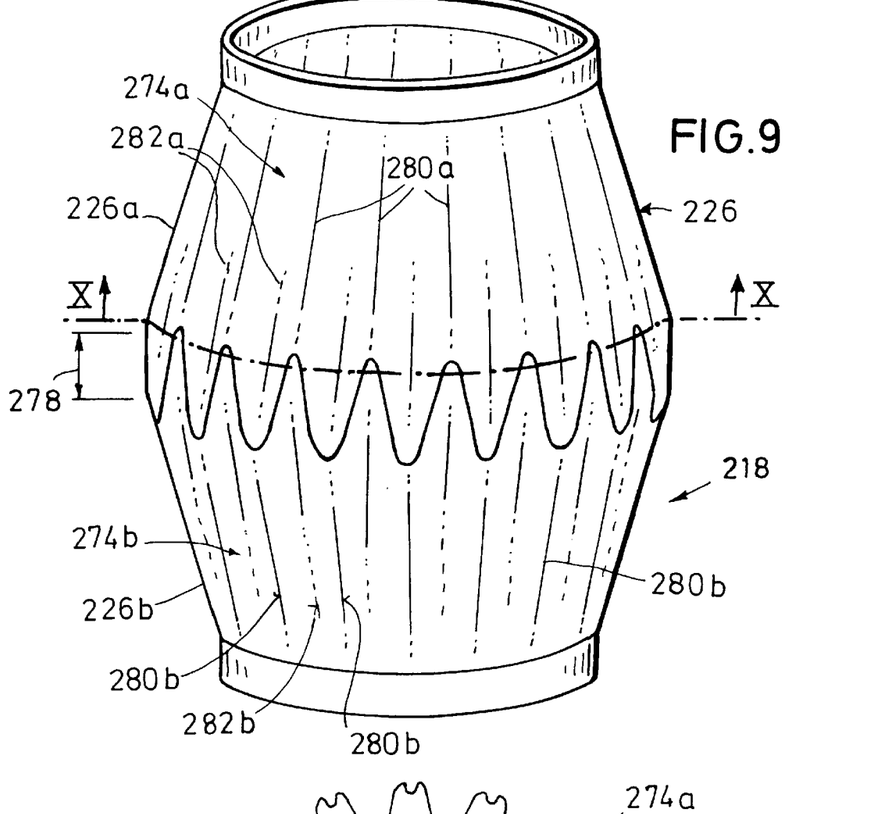
FIG. 9 is a perspective view of the reservoir of FIG. 8 in an at least partially expanded condition.
Figure 10:
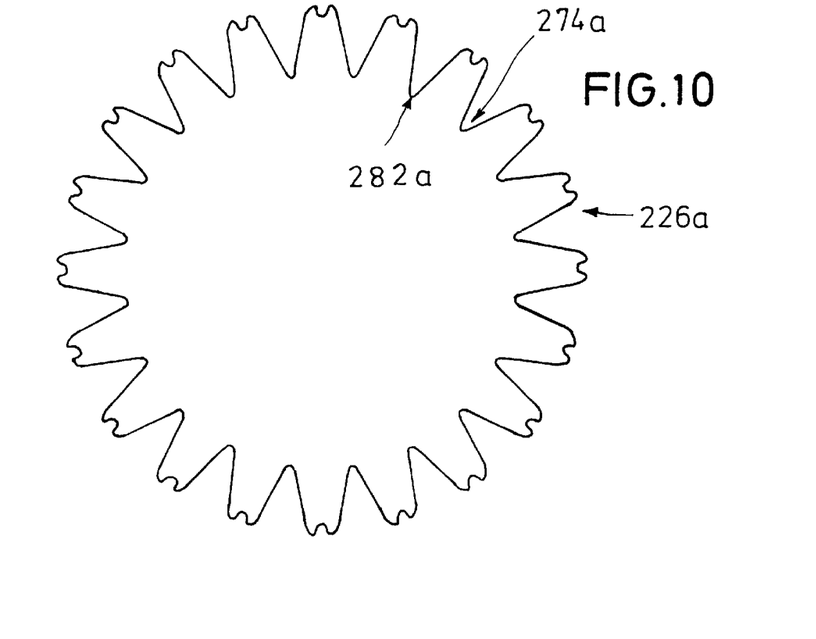
FIG. 10 is a view in section taken along line X—X in FIG. 9.

In more detail, the arrangement is such that the wall portion 226 of the reservoir 228 comprises two substantially frustoconical portions 226a, 226b as indicated in FIGS. 8 and 9, in such a way that the two portions 226a, 226b merge together or are connected together at their ends of largest diameter. It will be appreciated that the term frustoconical is to be interpreted in this context as meaning that it refers to a notional peripheral surface which is defined for example by the outer apex lines indicated at 280a and 280b respectively in FIG. 9 of the folds or pleats, as the folds or pleats clearly exclude the possibility of the peripheral surface of the hollow body being smooth, as would normally be considered to be the case when referring to frustoconical.

In the embodiment illustrated in FIGS. 8 through 11 the two portions 226a and 226b are of the same length and the folds of the two portions 226a and 226b are arranged in mutually displaced relationship by for example half the fold width in the peripheral direction of the reservoir 228. By virtue of that configuration and arrangement, in the transitional region 278 between the two portions 226a and 226b the outer apex lines 280a of the folds 274a of the portion 226a each blend into the inner apex lines 228b of the folds 274b of the other portion 226b. Consequently, in the transitional region 278, the outer apex lines 280b of the folds 274b of the portion 226b are respectively continued into the inner apex lines 228a of the folds 274a of the portion 226a. This arrangement in which the outer apex lines of the one portion 226a or 226b respectively are continued into the inner apex lines of the respective other portion consequently results in the configuration of the transitional region 278, which can be particularly clearly seen from FIG. 9, in which the end regions of the folds of the upper portion 226a and those of the folds of the lower portion 226b are in mutually overlapping relationship. That fold geometry in a particularly simple fashion permits expansion of the folds 274a and 274b with at the same time an increase in the diameter and volume of the reservoir 228, wherein the cone angle of the two frustoconical portions 226a and 226b alters in the direction of an enlargement.

The hollow body forming the wall 226 of the reservoir 228 can be produced in one piece from a suitable material such as plastic material, for example polypropylene, polyamide or HD-polyethylene, using a blow molding procedure. In that respect the procedure involved is desirably such that the hollow body acquires in the blow molding mold a configuration which corresponds to the functional configuration of the reservoir 218, as is shown for example in FIG. 11. That means that, for the purposes of introducing the reservoir 228 into the body of the fuel tank 210, the reservoir 218 is put by the application of suitable tensile forces into an extended or elongated shape in which the maximum diameter of the reservoir 228 is no greater than the opening 214 in the wall 212 of the tank 210. At the latest after reaching the position in which the bottom portion 220 is seated on the bottom wall 244 of the tank 210, as shown for example in FIG. 2 and in relation to this embodiment in FIG. 11, the reservoir 228 is completely released so that, under the effect of the stress therein which had previously been produced when elongating it into the extended configuration shown in FIG. 8, the reservoir 228 automatically resumes its initial configuration corresponding to the functional configuration shown in FIG. 11.

It will be appreciated that partial expansion of the reservoir 218 can also occur during insertion thereof into the tank 210.

At any event it is possible in the above-described manner to provide that the reservoir 218 or the wall 226 thereof is practically stress-free and thus the wall 226 remains permanently at least substantially free from loading, during the usual operation of the reservoir, the length thereof normally corresponding to the service life of the tank 210 and the reservoir.

In the embodiment illustrated in FIGS. 8 through 11 each portion 226a and 226b has twenty folds or pleats. The configuration of the transitional region 278, as already mentioned, makes it easier to change the shape of the reservoir 228. Upon expansion of the reservoir which takes place more or less automatically the diameter of the central region thereof can be enlarged from for example 152 mm to about 200 mm, with the length of the reservoir being reduced from 200 mm to between 180 and 170 mm. The thickness of the wall 226 of the hollow body constituting the reservoir 218 can be for example between 0.8 and 1.5 mm.

The above-described fold geometry of the embodiment of FIGS. 8 through 11 also affords sufficient inherent stiffness for the reservoir 218 or the wall 226 thereof so that there will normally not be any need for additionally providing a support arrangement corresponding for example to the support structure indicated at 22 in the embodiment of FIGS. 1 through 5, although the provision of a suitable support configuration is not to be excluded.

The chamber 252 shown in FIG. 11 communicates with the tank volume 230 outside the reservoir 228, as is also the case with the FIG. 7 embodiment. For that purpose the bottom portion 220 of the delivery unit 218 can be provided with a passage 286 which is disposed in the section plane in FIG. 11. It will be noted here that, as mentioned above, the embodiment of FIG. 7 may also have the communication between the chamber 152 therein and the volume of the tank surrounding the reservoir, formed by a passage corresponding to the passage 286 shown in FIG. 11.

It will be noted that the embodiment of FIGS. 8 through 11 may also be provided with a device for feeding and delivering the fuel, which corresponds to the embodiments of FIGS. 1 through 7, in which respect the adoption of means for feeding, delivering and conveying the fuel can depend on the respective applicable requirements or determining factors involved without thereby departing from the scope of the invention.

It will be appreciated that the above-described embodiments of the invention have been set forth solely by way of example and illustration of the principles thereof and that various modifications and alterations may be made therein without thereby departing from the spirit and scope of the invention.

What is claimed is:

1. A fuel tank for a motor vehicle, comprising
a fuel tank body having a wall defining the fuel tank body, the wall having a closable opening therethrough,
a reservoir having first and second ends and a boundary wall and being of smaller size than the tank body and disposed therein and inserted into the tank body through the opening in the wall thereof,
means connecting the reservoir to the tank body, and
firm components delimiting the reservoir at its first and second ends,
the reservoir being deformable at least at portions of the boundary wall thereof in such a way that after the reservoir has been at least partially introduced into the tank body the reservoir experiences a change in shape resulting in an increase in its volume within the tank body and a change in its cross-section such that the largest cross-section of the reservoir in its operative position is larger than the cross-section of the opening in the tank body wall available for insertion of the reservoir, and the deformable wall portions of the reservoir being between components at the ends of the reservoir.

2. A tank as set forth in claim 1 wherein the reservoir is of a round cross-section.

3. A tank as set forth in claim 1 wherein the reservoir defines a closed space having walls which only have apertures therethrough for the controlled feed and discharge of fuel.

4. A tank as set forth in claim 1 wherein the tank body has lower and upper wall portions, and
wherein the reservoir has walls laterally defining same and extending substantially between lower and upper wall portions of the tank body.

5. A tank as set forth in claim 1 wherein the component defining the reservoir at the end thereof which in the installed position is the upper end serves at the same time as a closure means for closing said opening in said tank body wall.

6. A tank as set forth in claim 1 wherein the reservoir is of an axially elongate configuration, and
wherein at least a part of the change in shape of the reservoir which results in the increase in volume thereof is effected by a reduction in the axial extent of the reservoir.

7. A fuel as set forth in claim 1 wherein the reservoir includes a means supporting the deformable wall portion of the reservoir.

8. A tank as set forth in claim 1 wherein at least portions of the walls of the reservoir are deformable under stress during insertion of the reservoir into the tank body.

9. A tank as set forth in claim 7 wherein said support means is deformable under stress during insertion of the reservoir into the tank body.

10. A tank as set forth in claim 1 wherein the parts of the reservoir which are deformable under stress experience a relief of stress when the volume of the reservoir increases within the tank body.

11. A tank as set forth in claim 1 wherein at least portions of the walls of the tank body are deformed under stress in the operative position in the tank body.

12. A tank as set forth in claim 7 wherein said support means is deformed under stress in the operative position of the reservoir in the tank body.

13. A tank as set forth in claim 6 wherein the axial extent of the reservoir after the reduction of the axial extent thereof approximately corresponds to the spacing between a closure element closing said opening in said tank body wall and the tank body wall portion disposed in opposite relationship to said closure element.

14. A tank as set forth in claim 6 wherein the tank body has first and second oppositely disposed wall portions, and
wherein the reduction in the axial extent of the reservoir results in stressing in parts thereof, said stressing being used to cause bracing of the reservoir between first and second oppositely disposed wall portions of the tank body.

15. A tank as set forth in claim 1 wherein the increase in volume of the reservoir occurs under the effect of fuel therein.

16. A tank as set forth in claim 1 wherein the deformable wall portion of the reservoir in its initial condition before the change in shape thereof is provided with fold means adapted to at least partially open in the course of said change in shape of the deformable wall portion.

17. A tank as set forth in claim 1 wherein the deformable wall portion of the reservoir comprises an elastically deformable material.

18. A tank as set forth in claim 1 wherein the deformable wall portion of the reservoir is pre-formed in such a way that an axial loading on the reservoir results in deformation thereof such as to cause an increase in the volume thereof.

19. A tank as set forth in claim 7
wherein after insertion of the reservoir into the tank body said support means also undergoes a change in shape corresponding to the change in shape of the deformable wall portion of the reservoir.

20. A tank as set forth in claim 7
wherein the support means is elastically deformable and is pre-formed in such a way that a reduction in the axial dimension of the reservoir results in deformation of the support means in the fashion of an increase in the volume of the reservoir.

21. A tank as set forth in claim 1
wherein the reservoir includes a hollow body having first and second substantially frustoconical portions including walls provided with fold means, and
wherein said frustoconical portions have largest-diameter regions thereof facing towards each other and joined together thereat.

22. A tank as set forth in claim 21
wherein said fold means of a said portion are arranged displaced relative to the fold means of the respective other said portion by half the extent of a fold means in the peripheral direction of the reservoir.

23. A tank as set forth in claim 22
wherein the depth of said fold means increases along the extent thereof from the respective end of the reservoir in a direction towards said largest-diameter region.

24. A tank as set forth in claim 21
wherein the reservoir has a longitudinal axis and includes a portion which extends in the direction of the longitudinal axis of the reservoir and in which said folds of the substantially frustoconical portions are in mutually overlapping relationship, and
wherein the outer apex lines of the fold means of a respective one said substantially frustoconical portion go into the inner apex lines of the fold means of the respective other substantially frustoconical portion.

25. A tank as set forth in claim 21
wherein the hollow body of the reservoir is made from plastic material by blow molding and the finished hollow body of a substantially bellows shape is of a configuration corresponding to the functional configuration of the reservoir in the tank body.

26. A tank as set forth in claim 1 and further including
a filling pipe having an outflow end,
a motor-driven fuel pump disposed within the reservoir,
wherein the reservoir has an intake opening and an upper region having at least one overflow opening,
wherein the outflow end of the filling pipe is connected to the intake opening of the reservoir,
the arrangement being such that fuel can flow through the at least one overflow opening out of the reservoir into the region of the tank body surrounding the reservoir.

27. A tank as set forth in claim 26
wherein the reservoir has first and second ends and rigid components at respective ones of said ends, and wherein the intake opening is disposed at one of said components.

28. A tank as set forth in claim 26
wherein the reservoir has a bottom portion, and further including
a chamber provided at the bottom portion of the reservoir outside same and in sealed relationship with respect thereto,
a jet pump disposed within said chamber and having a propulsion nozzle,
a return conduit connected to said nozzle for returning at least a part of the fuel delivered by the motor-driven pump,
a catch nozzle disposed in operative opposite relationship to the propulsion nozzle, and
an overflow conduit connected to the catch nozzle and extending upwardly into the reservoir.

29. A tank as set forth in claim 1 and further including
a delivery unit,
wherein the tank body at its wall portion in opposite relationship to said opening includes a mounting for said delivery unit.

30. A tank as set forth in claim 1 and further including
means for sealing off the reservoir with respect to the interior of the tank body surrounding same such that there is in the reservoir always a defined minimum amount of fuel and the fuel level can only fall below that minimum amount when the volume of the tank body surrounding the reservoir is substantially empty.

31. A fuel tank for a motor vehicle, comprising
a fuel tank body having a wall defining the tank body, the wall having a closable opening therethrough,
a reservoir having first and second ends and a boundary wall and being of smaller size than the tank body and disposed therein inserted into the tank body through the opening in the wall thereof,
first and second substantially non-deformable portions at respective ones of the ends of the reservoir,
means connecting the reservoir to the tank body,
the reservoir being deformable at least at portions of the boundary wall thereof between said first and second portions whereby after the reservoir has been at least partially introduced into the tank body the reservoir can experience a configurational change such that the largest cross-section of the reservoir in its operative position within the tank body is larger than the opening in the tank body wall.

* * * * *